April 25, 1967   A. H. OSWALD   3,316,127
METHOD AND APPARATUS FOR MANUFACTURE OF DRY CELLS
Filed Feb. 12, 1965   6 Sheets-Sheet 1
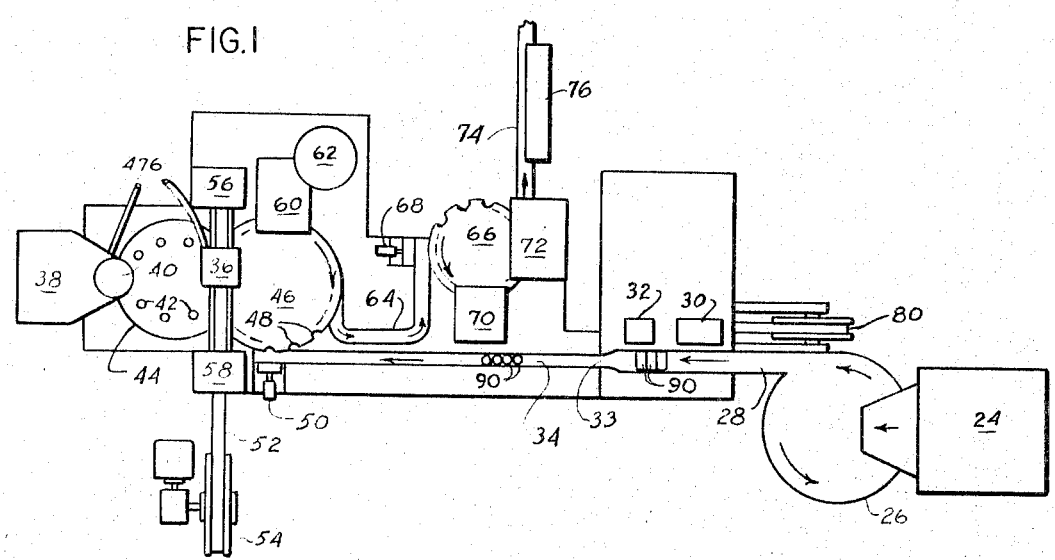
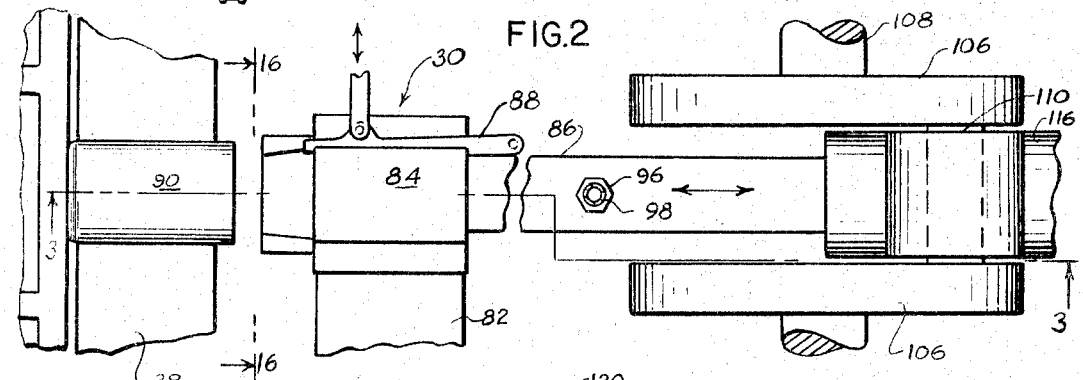
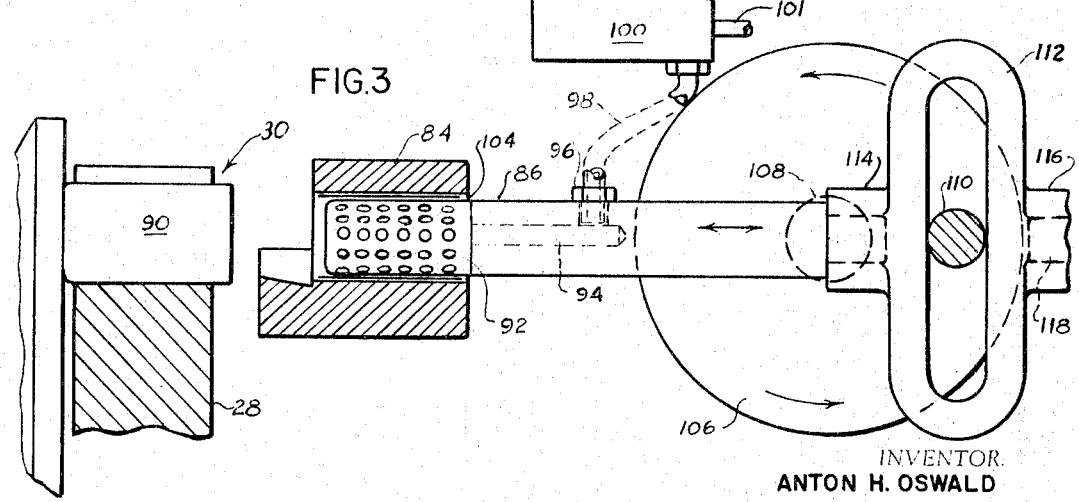
INVENTOR.
ANTON H. OSWALD
BY James and Franklin
ATTORNEYS April 25, 1967     A. H. OSWALD     3,316,127
METHOD AND APPARATUS FOR MANUFACTURE OF DRY CELLS
Filed Feb. 12, 1965     6 Sheets-Sheet 2
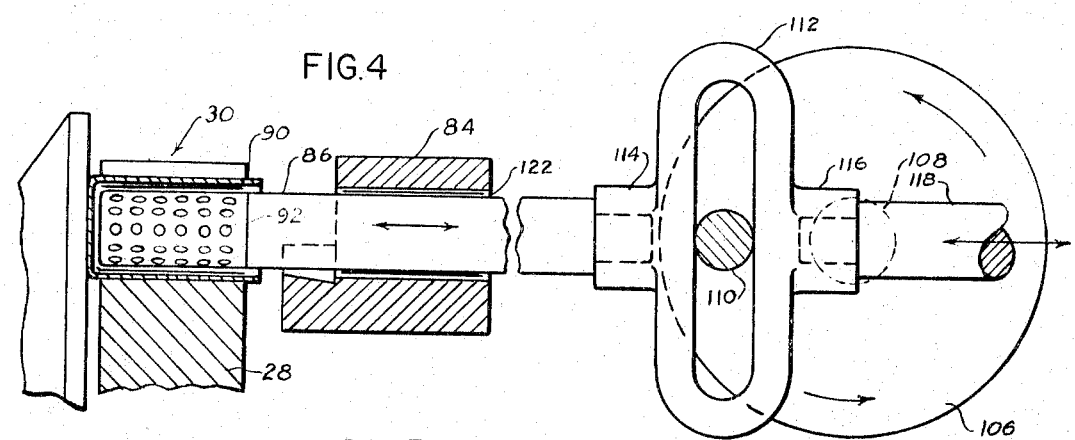
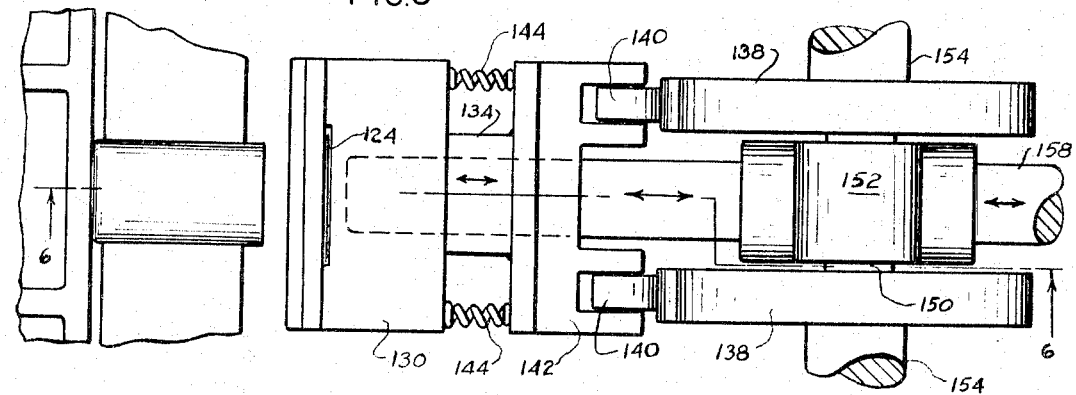
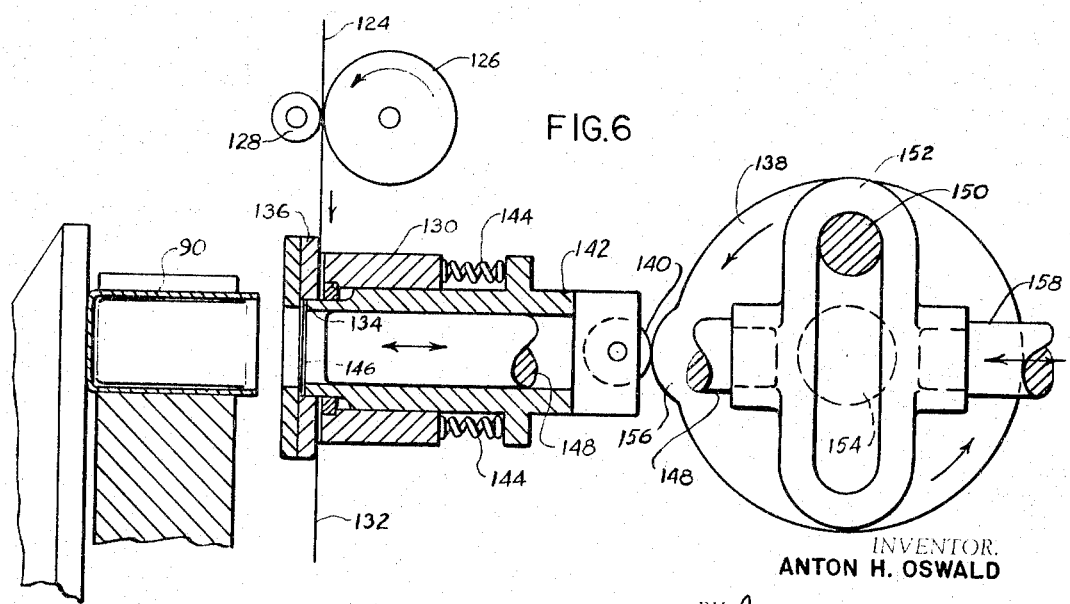
INVENTOR.
ANTON H. OSWALD
BY James and Franklin
ATTORNEYS

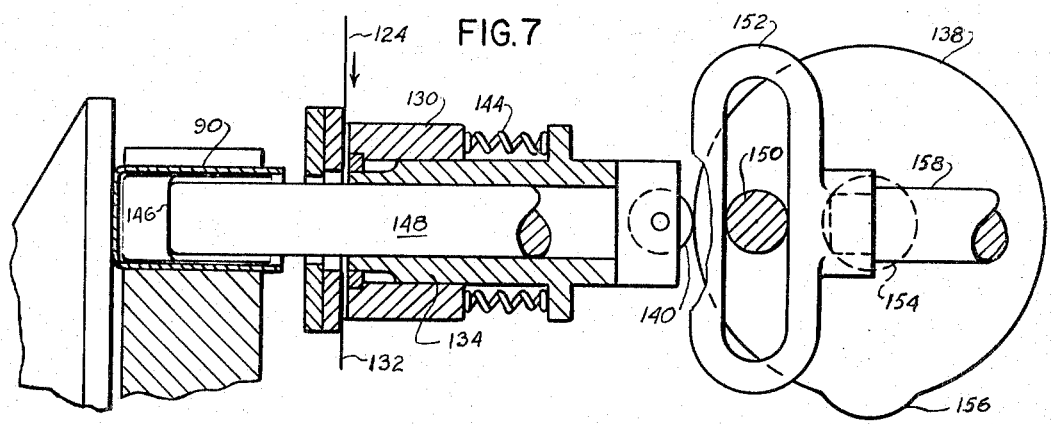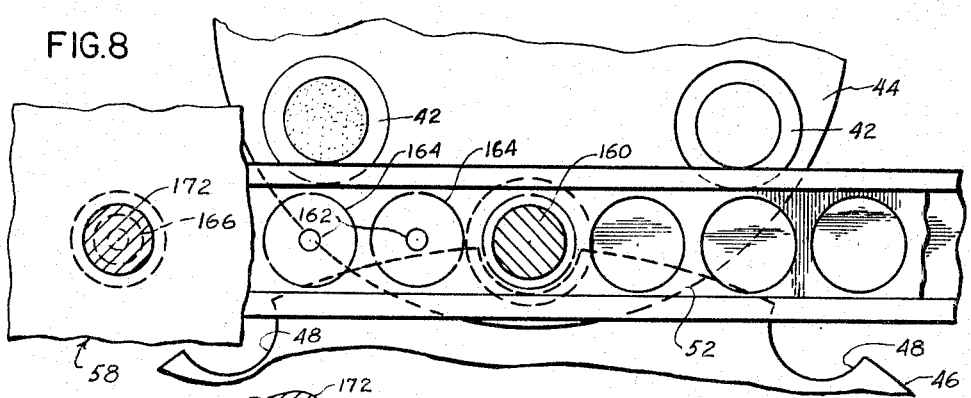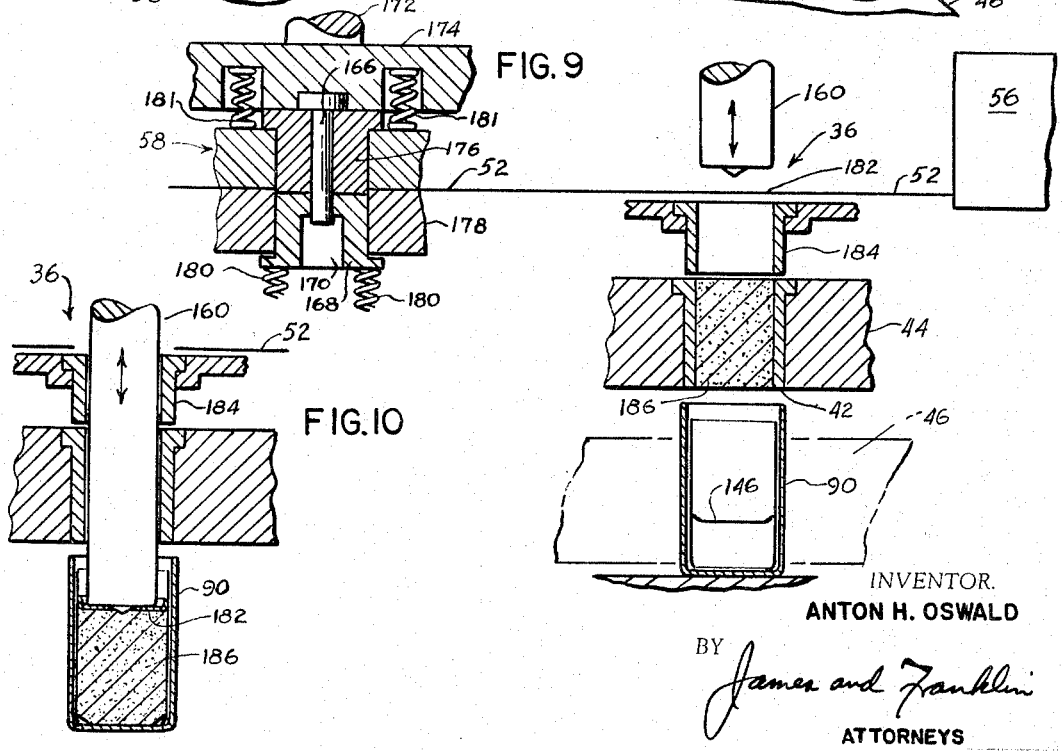

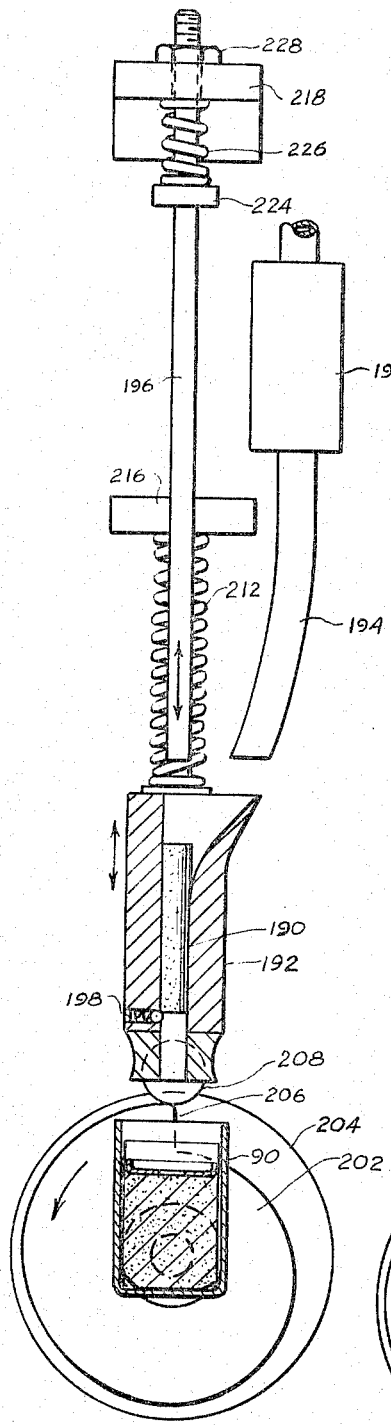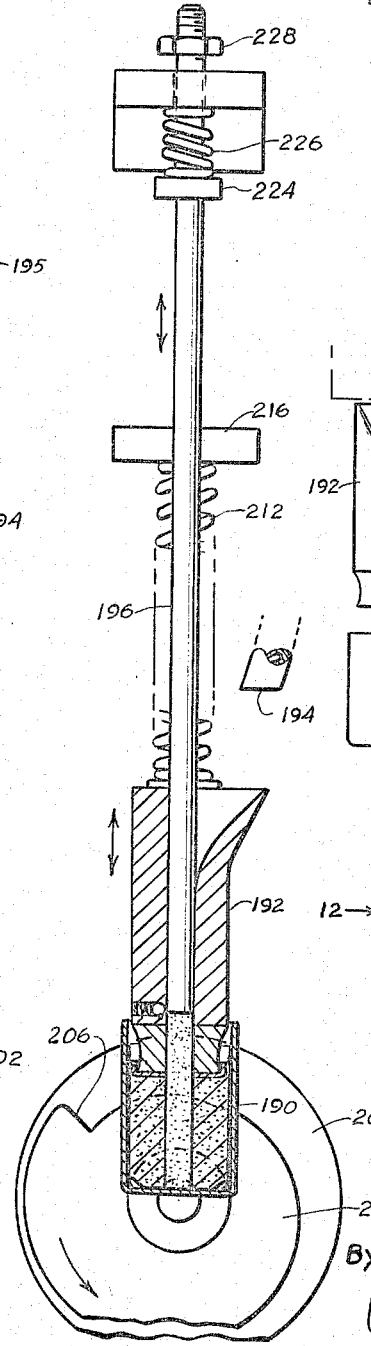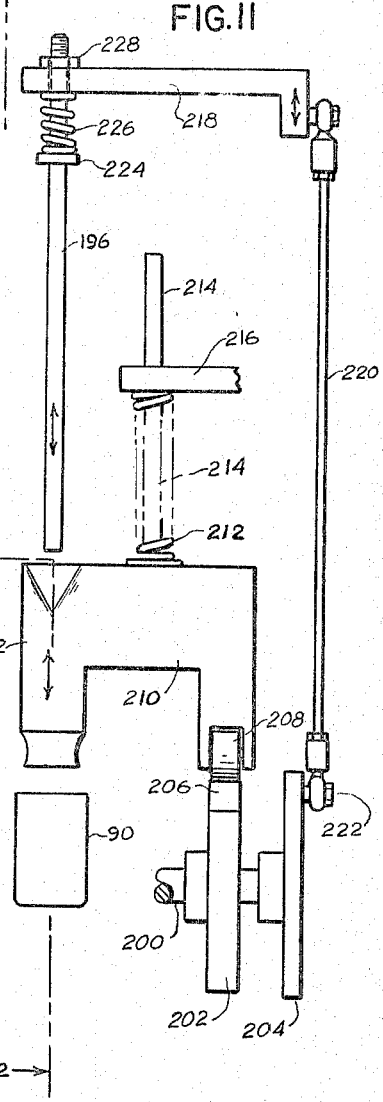

April 25, 1967 A. H. OSWALD 3,316,127
METHOD AND APPARATUS FOR MANUFACTURE OF DRY CELLS
Filed Feb. 12, 1965 6 Sheets-Sheet 5
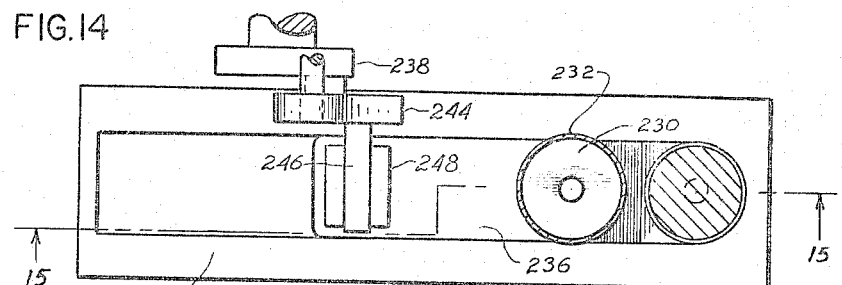
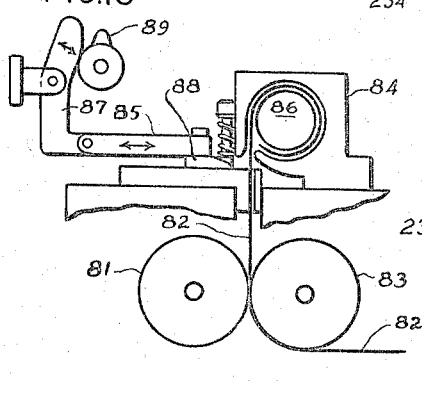
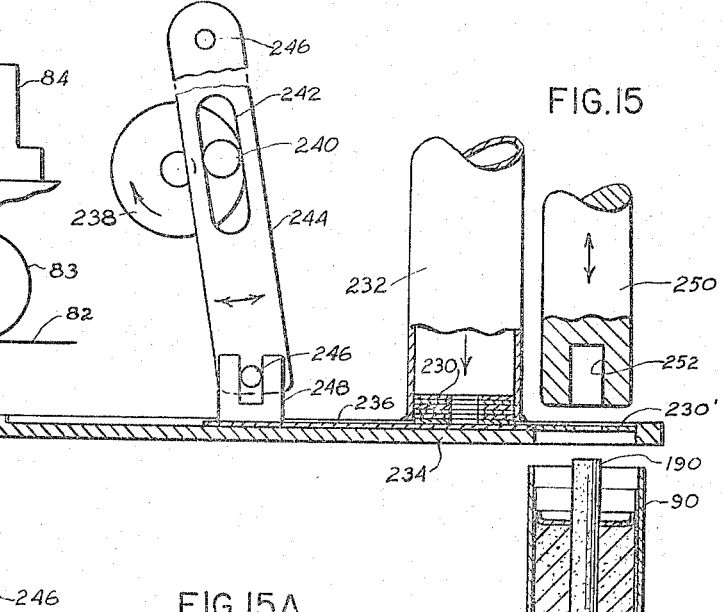
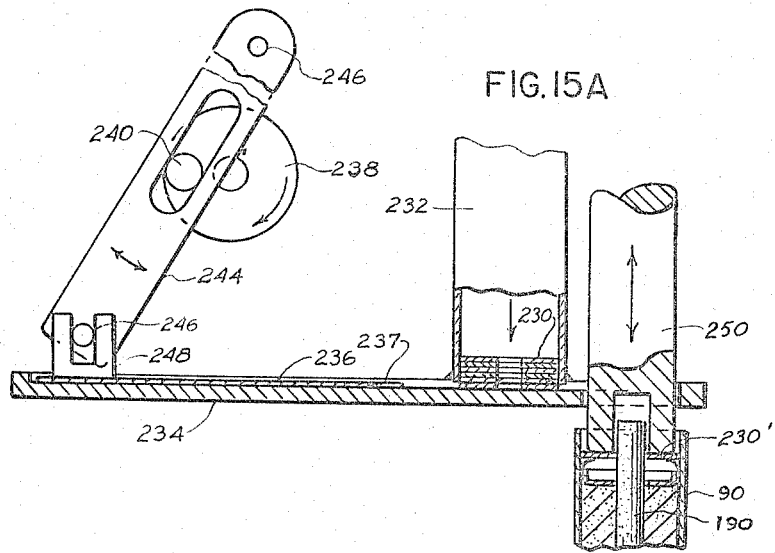
INVENTOR.
ANTON H. OSWALD
BY James and Franklin
ATTORNEYS

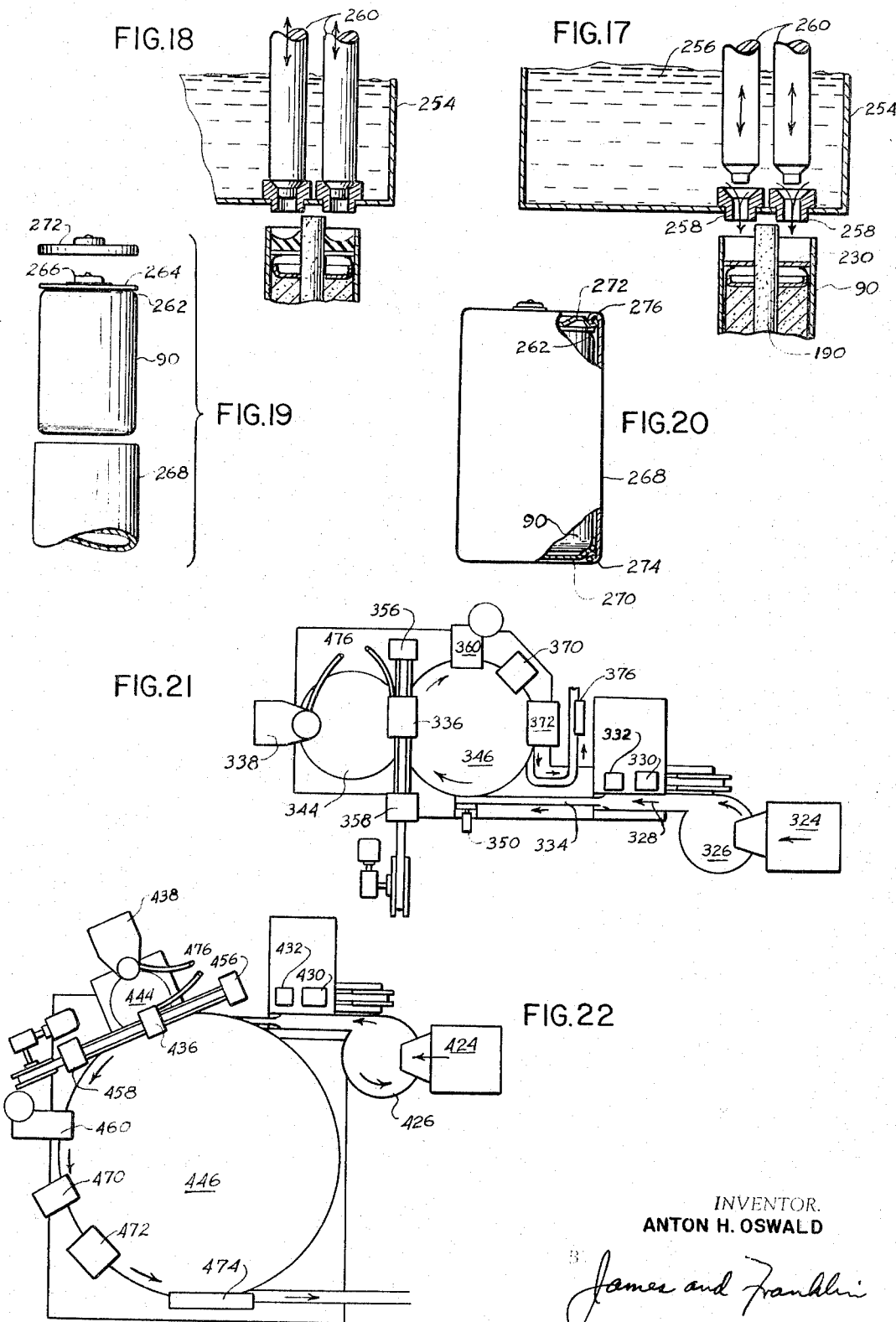

United States Patent Office 3,316,127
Patented Apr. 25, 1967

3,316,127
METHOD AND APPARATUS FOR MANUFACTURE OF DRY CELLS
Anton H. Oswald, Wayne, N.J., assignor to Bright Star Industries, Inc., Clifton, N.Y., a corporation of New Jersey
Filed Feb. 12, 1965, Ser. No. 432,276
14 Claims. (Cl. 136—175)

This invention relates to the manufacture of dry cells, and more particularly dry cells using a chemically treated lining.

Conventional dry cells of the flashlight type employ a carbon rod in a zinc container or can, with a "mix" therebetween. The mix contains lampblack acting as a vehicle for the chemical content or electrolyte. Improved cells employ a chemically treated paper lining or so-called "bibulous" lining in the can. The general object of the present invention is to improve the manufacture of such dry cells.

A more specific object centers around the formation and insertion of the lining. In accordance with my process, the lining is formed loosely around the perforate hollow end of a plunger, and by the application of suction the liner is held on the plunger as the latter is inserted in the can. On terminating the suction the liner is released for retraction of the plunger, and in preferred form a positive pressure is applied thereby not only releasing the liner but expanding it against the inside of the can.

A further object of the present invention is to improve and facilitate the insertion of a shaped and measured quantity of mix into the lined can. The mix is pasty, adherent, and abrasive, and causes difficulty when using a naked plunger to displace the mix through its shaping die into the can. I employ a plunger of reduced diameter, and a wipedown washer of increased diameter, this being disposed between the mix and the plunger, thus keeping the bottom of the plunger clean, as well as wiping the wall of the die from which the mix is being displaced. The life of the plunger is increased ten fold.

In preferred practice the wipedown washers are formed from a paper strip which is fed beneath the plunger and above the mix. The strip is prepunched and precut to form wipedown washers which are retained in the strip until the plunger is reached. The plunger blanks the washer from the strip and moves the same against the mix when inserting the mix into the lined can.

In accordance with a further feature and object of the invention, a carbon rod is forced into the mix, and the mix is held in position by means of a carbon guide or loader which surrounds the carbon and which is moved against the mix as the carbon is being forced into position. In consequence the mix is tamped or compressed in the cell. The wipedown washer helps keep the bottom end of the carbon loader clean.

The top of the cell is conventionally sealed by molten asphalt or pitch which is flowed into the top of the can around the carbon rod. A further object of the invention is to improve the seal provided by the molten pitch. In the present manufacture a subseal washer is inserted above the wipedown washer. It is a relatively stiff washer which just fits the inside of the can, and so wipes away any mix on the can wall. Moreover, it is inserted far enough to bend the top edge of the cylindrical liner inward, thereby exposing additional clean metal to the molten pitch. The subseal washer supports and limits the pitch to the upper end of the cell.

To accomplish the foregoing objects, and additional more specific objects which will hereinafter appear, my invention resides in the apparatus elements and their relation one to another, as are hereinafter more particularly described in the following specification. The specification is accompanied by drawings in which:

FIG. 1 is a plan view showing an apparatus embodying features of my invention;

FIG. 2 is a schematic fragmentary plan view drawn to larger scale and showing the means for forming and inserting a cylindrical liner;

FIG. 3 is a fragmentary vertical section taken approximately in the plane of the stepped line 3—3 of FIG. 2;

FIG. 4 is a similar section but showing the plunger advanced into the can to insert a liner therein;

FIG. 5 is a fragmentary plan view of an adjacent station for forming and inserting a bottom liner disc;

FIG. 6 is a vertical section taken approximately in the plane of the stepped line 6—6 of FIG. 5;

FIG. 7 is a similar view but showing the plunger advanced to insert the bottom liner disc in the cell;

FIG. 8 is a fragmentary horizontal section showing companion stations for precutting a wipedown washer and for inserting a shaped and measured charge of mix into a lined cell;

FIG. 9 is a fragmentary vertical section through the same stations;

FIG. 10 is a section similar to a part of FIG. 9 but showing the relation of the parts when the plunger has been moved down against a wipedown washer and then the mix to displace the same into a lined cell;

FIG. 11 is a fragmentary schematic elevation of a carbon loading station;

FIG. 12 is a section drawn to larger scale and taken approximately in the plane of the stepped line 12—12 of FIG. 11;

FIG. 13 is a view similar to FIG. 12 but showing the carbon pusher and loader in down position;

FIG. 14 is a partically sectioned fragmentary plan view of a station which inserts a subseal washer;

FIG. 15 is a fragmentary vertical section taken approximately in the plane of the stepped line 15—15 of FIG. 14;

FIG. 15A is a view similar to view 15 but showing the relation of the parts when the subseal washer has been inserted in the can;

FIG. 16 is an elevation taken approximately at the line 16—16 of FIG. 2.

FIG. 17 is a fragmentary vertical section through a pitch loading station;

FIG. 18 is a similar view after potting;

FIG. 19 shows a cell about to be received in a leak resistant jacket;

FIG. 20 is a partially sectioned elevation of a complete cell;

FIG. 21 is a plan view drawn to greatly reduced scale and showing the previously illustrated stations arranged differently from the arrangement of FIG. 1; and FIG. 22 shows still another relative positioning of the stations.

The illustrated apparatus makes dry cells of the flashlight type, and more specifically of the "D" size. However, the principles are applicable to other dry cells. Referring to the drawings, and more particularly to FIG. 1, drawn zinc cans are loaded in a bin 24 from which they flow into a can positioning hopper 26 which delivers them in collateral horizontal relation across a conveyor track 28. The action of hopper 26 is such that the open ends of the cans all face a station 30 at which a cylindrical liner is inserted. This is made of impregnated fibrous sheet material, typically cereal coated paper, sometimes referred to as a bibulous liner. The liner is impregnated with a suitable electrolyte, and other desired chemicals. At an adjacent station 32 a bottom liner disc made of battery board or kraft paper is inserted. The bottom liner disc is not impregnated with electrolyte.

The lined cans, which are horizontal at stations 30 and 32, are turned upright at 33, and are moved along a track 34 to a mix transfer station at 36. The mix is a pasty mass containing the electrolyte and other desired chemicals. It is first loaded into a hopper 38, and is then shaped and measured at a loading station 40 by forcing it into vertical holes or dies 42 in a mix turret 44. A portion of this overlaps a can turret 46 which has can pockets 48 around its periphery. The upright cans are transferred from track 34 into pockets 48 by a suitable pusher or transfer means indicated at 50. The relative location and timing of turrets 44 and 46 is such that a mix die 42 is brought over a can pocket 48 at the mix transfer station 36.

Meanwhile a strip of paper 52 is supplied from a roll 54 and passes through station 36 to a feed mechanism and takeup roll located at 56. Ahead of station 36 there is a station 58 for prepunching and precutting wipedown washers which are nearly but not quite severed from paper strip 52, and which are carried along by the strip to the transfer station 36. At station 36 a plunger blanks a wipedown washer from the strip, and pushes it downward against the mix and into a lined can in turret 46.

The turret 46 then carries the filled can to a carbon rod inserting unit 60, which receives carbon rods from a positioning hopper 62. After insertion of a carbon rod the can is carried by turret 46 to a track 64, which brings it to the peripheral pockets of another turret 66. A suitable transfer device 68 feeds the can from track 64 into the pockets of the turret 66.

The turret 66 moves the cans to a station 70 where subseal washers are inserted, and then to a station 72 where molten pitch is flowed into the tops of the cans. The cans then move along a track 74 through means to additionally heat the pitch in the cans, this usually being done by means of open flames distributed along a so-called flaming station 76.

There are additional stations which may be conventional, and which are not shown here because the intervening track 74 may be relatively lengthy in order to assure cooling and hardening of the pitch. These additional stations serve to bevel the top edge of the can inward somewhat; to add a top insulation washer; to add a metal carbon cap over the exposed upper end of the carbon rod; to add a protective or leak resistant jacket; to add a top metal cap forming a part of the jacket; and to crimp the top of the jacket around the top metal cap.

FIGS. 2, 3, 4, and 16 of the drawing show the mechanism which is located at station 30 in FIG. 1. This mechanism forms and inserts the cylindrical liner. The liner is formed from a strip of treated paper which is supplied from a roll indicated at 80 in FIG. 1. This strip is shown at 82 in FIGS. 2 and 16, and is fed into a die 84 where it is curled to cylindrical form loosely around the leading end of an axially reciprocable plunger 86. The curled end of the strip is severed from the remainder of the strip by means of a member 88 which acts as a cutting knife. The cut allows some overlap of the ends of the curled strip.

The strip is fed a desired amount by a feed roll 81 (FIG. 16) which is intermittently driven from a main timing shaft, and which works with a pinch roller 83. FIG. 16 also shows how knife 88 may be driven through a link 85 and a cam operated lever 87, by means of a cam 89 driven from the main timing shaft. A spring return, not shown, is provided.

One of a series of the open-ended zinc cans is shown at 90 (FIGS. 2 and 3), it being disposed with its axis horizontal, and its open end toward the die 84. A series of such cans in collaterally disposed relation is moved along the track 28 previously referred to, and the cans are successively stopped at the station (generally designated 30) by conventional feed and stop means unnecessary to describe in detail.

The end of plunger 86 is hollow and perforated as indicated at 92 (FIG. 3) and is connected by means of a passage 94 and a connection 96 to a flexible hose 98 and an air valve 100. This is connected at 102 to a source of suction or vacuum tank, not shown. The suction draws the cylindrical liner 104 against the perforated end of the plunger, which then is advanced to insert the liner in the can 90, as shown by the change from FIG. 3 to FIG. 4 of the drawing.

The plunger may be reciprocated in any desired fashion. In the present case there are crank discs 106 rotated by a shaft 108 (FIG. 2) and carrying a crank pin 110. Crank pin 110 is received in a vertical yoke 112 (FIG. 3) which is connected at 114 to the plunger 86, and at 116 to a slide or guide rod 118, better shown in FIG. 4. It will be evident that rotation of the crank reciprocates the plunger between the retracted position shown in FIG. 3, and the forward position shown in FIG. 4.

The spool 101 of valve 100 (FIG. 3) is connected to the crank shaft 108 (FIG. 2) in such fashion that suction is applied only when needed, that is, for the advance movement of the plunger which inserts the liner. The plunger diameter is appreciably smaller than the can diameter. In the position shown in FIG. 4 the suction is stopped, thereby releasing the liner from the plunger prior to retraction of the plunger.

In preferred form, the plunger is alternately subjected to pressure and suction, and for this purpose the control valve 100 (FIG. 3) is additionally connected at 120 to a pressure source or pressure tank. In the forward position shown in FIG. 4 pressure instead of suction is applied to the plunger, thereby not only insuring release of the liner from the plunger, but actually expanding the liner outward snugly against the inside wall of the can, prior to retraction of the plunger.

Meanwhile, for rapid operation the liner strip is fed forward and curled around the rear or imperforate portion of the plunger, as is indicated at 122 in FIG. 4. Thus, when the plunger is retracted to the position shown in FIG. 3 the next cylindrical liner is waiting to be immediately attracted by suction against the perforate part of the pluger. In brief, suction is applied when the plunger is in retracted position and during its forward movement, and pressure is applied momentarily when the plunger is in its forward position. Neither is needed during retraction of the plunger. The control valve 100 may be operated by a suitable cam (not shown) on the crank shaft 108.

The bottom disc inserting mechanism at station 32 in FIG. 1 is shown in greater detail in FIGS. 5, 6 and 7 of the drawing. Referring first to FIG. 6, a strip 124 of suitable liner material is fed downward from a roll of such material (not shown), by feed means including a feed wheel 126 and a pinch roller 128. The paper strip is fed to a fixed die block 130, and the blanked strip or scrap is discharged at 132.

The desired circular discs are somewhat larger in diameter than the inside of the can. They are punched from the strip 124 by means of a hollow or annular paper punch 134 cooperating with a stationary paper die 136. The punch 134 is shown in its cutting position in FIG. 6, it having been advanced by means of cam discs 138 (FIGS. 5 and 6) bearing against cam rollers 140 which are carried by a crosshead 142 at the rear end of the paper punch 134. The punch is retracted by four compression springs 144 bearing against the crosshead. This action blanks a disc 146 from the strip 124, which disc is delivered into the can by means of a plunger 148.

In FIG. 6 a part of the plunger 148 is broken away to better show the relation of cam 138 to cam roller 140. The cams 138 may be used also as crank discs, and for this purpose they carry between them a crank pin 150 which is received in a vertical slotted yoke 152. When the cam and crank mechanism is rotated by shaft 154 the plunger 148 is moved from the intermediate position shown in FIG. 6 to the forward position shown in FIG. 7. Meanwhile, the paper punch is retracted by springs 144 because the cam projection 156 moves away from the cam roller 140 as shown in FIG. 7. This figure also shows how the bottom liner disc 146 is inserted part way through the cylindrical liner by the plunger 148. The parts could be so proportioned as to fully insert the bottom liner, but it is preferred to insert it to an intermediate position because this reduces the possibility of forming an air lock beneath the mix when the mix subsequently is forced into the can. Moreover, the bottom disc at intermediate position serves to hold the cylindrical liner expanded to maximum diameter in the can.

As before, the yoke 152 may be additionally provided with a slide or guide 158. The feed roll 126 may be driven by an appropriate cam from shaft 154, which drives the cams 138 and crank 150. Usually shaft 154 would be the same shaft as shaft 108 in FIG. 2.

It will be recalled from FIG. 1 that the lined cans are turned upright and are moved along a track 34 to a turret 46 for movement to a mix transfer station 36. The transfer is greatly aided by use of a wipedown washer, and the mechanism for this may be described with reference to FIGS. 8, 9, and 10 of the drawing. FIGS. 8 and 9 show how the mix turret 44 overlies the periphery of the transfer or feed turret 46. (FIG. 9 is displaced somewhat to the right of FIG. 8.) A filled die or chamber 42 of mix turret 44 comes into registration with a lined can 90, directly beneath a vertical transfer plunger 160, as is shown in FIGS. 8 and 9. The paper strip 52 previously referred to is fed between the mix turret 44 and the raised plunger 160.

On its way to the transfer station the paper strip 52 preferably is prepunched and precut to form the desired wipedown washers. The strip is prepunched to form center holes 162 at intervals, as shown in FIG. 8, and there is a circular or peripheral cut 164 which defines the circumference of the wipedown washer, but this cut is preferably interrupted at a few points so that the washer adheres to and is carried along by the strip 52. The diameter of the wipedown washer is preferably substantially greater than the inside diameter of die 42, and of the can 90. This makes it possible to make plunger 160 substantially smaller in diameter than die 42.

The station for precutting the strip 52 is indicated generally at 58. It comprises a punch 166 which cooperates with a die 168 to form the center hole 162. The scrap is discharged at 170 and is received in a suitable bin, not shown. The center hole is needed for subsequent passage of the carbon rod. The motion of punch 166 is provided by a vertically reciprocable rod 172 carrying a die element 174 which in turn carries the punch 166.

The interrupted peripheral cut is provided by means of an additional punch 176 cooperating with a stationary die 178. Die 168 is preferably spring loaded, as indicated by the compression springs 180, and the motion of punch 176 relative to die 178 is limited to a very slight amount, sufficient only to interruptedly sever the periphery of the washer, as explained and shown in FIG. 8. The return movement of the punches is aided by means of compression springs 181.

Referring now to the right-hand portion of FIG. 9, the precut wipedown washer is shown at 182 beneath the transfer plunger 160, the washer being substantially greater in diameter than the plunger and the can. A washer forming die 184 preferably is disposed between the washer 182 and the slug of mix 186. Descent of plunger 160 blanks the wipedown washer 182 from the strip 52 and pushes it through the die 184 and against the mix 186. Its periphery is turned upward by the die 184. The washer and mix then are pushed down into the can and against the bottom disc 146. The die 42 is wiped clean by the washer, even though plunger 160 is say 1/32-inch smaller in diameter than the die.

The continued downward movement of plunger 160 pushes the mix 186 all the way into the can and below the top edge of the cylindrical liner, as shown in FIG. 10.

In practice the plungers 172 and 160 in FIG. 9 preferably descend at the same time, rather in alternation. The mix is topped by the wipedown washer 182, and when plunger 160 rises, its lower end remains clean, despite the sticky nature of the mix, this being so because the washer remains with the mix. Because the washer wipes the walls of the mix die 42, and because plunger 160 is reduced in diameter, there is no abrasion on the outside of the plunger.

This improvement increases the life of the plunger indefinitely. Heretofore about 5 million cells would be made before replacement of the plunger, but the new plunger has made over 75 million cells with no discoverable sign of wear.

The takeup unit for the blanked strip 52 is shown at 56. It may be conventional and need not be described in detail. It preferably includes feed mechanism to move the strip intermittently an amount corresponding to the pitch or spacing between washers, and it may include either a takeup roll or a bin to receive the blanked strip or scrap.

Referring to FIG. 1, it will be recalled that the turret 46 next moves the filled can to a station 60 where the carbon rod is inserted. The mechanism at station 60 may be described in greater detail with reference to FIGS. 11, 12, and 13. Referring to FIG. 12, a carbon rod 190 is fed to a carbon loader 192 through a delivery tube 194 which runs upward to a suitable hopper which aligns the carbon rods. An appropriate release or metering mechanism may be provided at 195 to release one carbon rod for each cell. The carbon rod is inserted by downward movement of a pusher or driver 196 which passes into the carbon loader 192. The carbon 190 is momentarily arrested in the surrounding loader 192, as by means of a spring pressed detent ball indicated at 198.

In preferred form the loader 192 is itself vertically reciprocable, and is moved down into the cell, as shown by the change in position from FIG. 12 to FIG. 13. This has the advantage not only of better and more accurately guiding the carbon rod 190, but also of holding the mix downward during the insertion of the carbon rod.

Referring now to FIG. 11, the operating mechanism is driven by a shaft 200 which carries a cam 202 and a crank disc 204. The cam 202 is a generally spiral cam having a quick drop indicated at 206 (FIGS. 12 and 13). The cam engages a cam roller 208 carried by a rearward extension 210 (FIG. 11) from the carbon loader 192. The loader is urged downward by a compression spring 212, shown located around a vertical guide rod 214 which is slidable in a fixed support 216. Spring 212 is compressed between the fixed support 216 and the vertically moveable part 210. Thus, the restraint on the mix is yieldable, to accommodate the displacement caused by the inserted carbon rod.

The carbon pusher 196 is carried by a horizontal arm 218 (FIG. 11). This is connected by a link 220 to a crank pin 222 on the crank disc 204. Rotation of the crank disc causes a relatively long vertical stroke of the pusher rod 196. The member 218 is slidable carried or guided by suitable vertical guide means, not shown. A long stroke is needed because in its raised position the pusher 196 is completely withdrawn from the carbon loader 192 in order to open the top of the loader to receive the next carbon rod delivered through tube 194. In its down position it must force the carbon rod all the way home to the bottom of the cell.

To provide tolerance for this, the rod 196 is preferably provided with a collar 224 receiving a compression spring 226 disposed between the arm 218 and the collar 224. The upper end of the rod is slidable in arm 218, and thus the pusher 196 may yield when the carbon rod has been forced all the way down. This also is shown by the change from FIG. 12 to FIG. 13, because in the latter figure the spring 226 is shown compressed, and the stop nut 228 is shown raised from the arm 218.

Reverting to FIG. 1, it will be recalled that the cans next are transferred to another turret 66, which moves them through a station 70 where a subseal washer is inserted. The mechanism of this station may be described with reference to FIGS. 14, 15, and 15A of the drawing. The subseal washers are relatively stiff washers previously stamped from suitable sheet material. Typically, they may be "tuf-board," a hard fibrous board 0.040 inch in thickness, and impregnated with wax.

The washers 230 are loaded into an upright tube or magazine 232 disposed over a track or guide 234 on which a feed blade or slide 236 is moveable. Slide 236 has a thickness corresponding to that of the washers 230, and it is reciprocated once for each can moved to the station. The slide may be reciprocated in any suitable fashion, and in the present case this is schematically illustrated as comprising a crank 238 carrying a crank pin 240 received in the slot 242 of an arm 244 oscillatable on a fixed pivot 246. Rotation of the crank pin oscillates the arm 244 between the forward position shown in FIG. 15 and the rearward position shown in FIG. 15A. Arm 244 is connected to slide 236 by means of a pin 246 and block 248. In the retracted position of FIG. 15A the forward end of the slide is behind the magazine 232, thus permitting the stack of washers to descend by the thickness of one washer, with the lowermost washer resting on track 234.

Referring now to FIG. 15, forward movement of the slide moves the lowermost washer to and holds it at the position 230' where it is disposed directly over the can 90, and directly beneath a plunger 250. The lower end of the plunger is hollowed or counterbored at 252 to clear the upper end of the carbon rod 190. The plunger 250 is moved downward at about the same time the slide 236 is retracted, and FIG. 15A shows the plunger in its down position, after inserting the subseal washer 230' into the can. The retraction of slide 236 again permits descent of the washers in magazine 232.

The subseal washer fits the can tightly enough to wipe it clean. Moreover, it should be noted that it is inserted far enough to bend the top edge of the cylindrical liner inward beneath the washer. This will be seen from a comparison of FIGS. 15 and 15A, it being observed that the upper end of the liner in FIG. 15 is higher than the final position of the subseal washer 230' in FIG. 15A.

This has the advantage of exposing clean metal on the inside of the can to subsequently receive molten pitch. At this added ring of metal there is almost no possibility of the pitch coming into contact with a film or residue of mix which may have contacted the can wall during insertion of the mix into the can.

Reverting to FIG. 1, the turret 66 moves the cans from station 70 to a station 72 where the molten pitch is added. This station may be described with reference to FIGS. 17 and 18 of the drawing. FIG. 17 shows a pitch tank 254 filled with molten pitch or asphalt 256. It has nozzles 258 disposed over the can 90 and straddling the carbon rod 190. Flow through the nozzles is controlled by vertically moveable valves 260. These move between a raised or open position shown on FIG. 17, and a down or closed position shown in FIG. 18.

The subseal washer 230 acts as a bottom for the pitch. A measured quantity of pitch is discharged, and the valves 260 then stop the flow as shown in FIG. 18. The pitch is subjected to additional heat by means of a so-called "flaming" step which is conventional and is not illustrated in the drawing except that in FIG. 1 the part 76 represents the "flaming" area.

The remainder of the process may be conventional. It prefereably includes cooling the pitch; spinning or bevelling the upper edge of the can inward slightly, as indicated at 262 in FIG. 19; following which an insulation top washer 264 is added. This is large enough in diameter to rest on top of the inturned edge of the can. A small inverted cup shaped metal cap 266 is applied to the upper end of the carbon rod. This assembly is inserted in a protective or leak-resistant jacket, and in the present case the jacket comprises a tubular wall 268 (FIG. 20) made of insulating material and closed at the bottom by means of a metal disc 270 (FIG. 21). The tubular jacket is then closed at the top by means of a metal top disc 272, the vertically flanged rim of which is interlocked with the subsequently inwardly and downwardly crimped top edge of the side wall 268. At the bottom edge of the side wall there is an inward and upward curl or bead which is indicated at 274 in FIG. 20. The inward and downward curl or crimp of the top edge of the side wall is indicated at 276.

The stations need not be relatively positioned as shown in FIG. 1. They preferably are disposed in the previously described sequence, but the location or positioning may be varied, and two other arrangements are shown in FIGS. 21 and 22. In FIG. 21 the supply of cans is loaded at 324, hoppered at 326, and then fed in horizontal position to a track 328, just as previously described. The cans thus are moved through stations 330 and 332 which respectively insert a cylindrical liner and a bottom liner disc. The cans then are turned upright along a track 334 to a pusher 350 which moves them into the peripheral pockets of a turret 346. The mix turret 344, the mix transfer station 336, the mix hopper 338, the paper precut station 358, and the paper feed and takeup unit 356, all correspond to the parts previously described in FIG. 1, but in FIG. 21 the corresponding numerals have been raised by 300.

In FIG. 21 the turret 346 replaces the two turrets 46 and 66 in FIG. 1. Turret 346 moves the cans through a carbon inserting station 360, a subseal washer inserting station 370, and a pitching station 372. The "flaming" area is indicated at 376.

In FIG. 22 substantially all of the operations are performed around the periphery of a single large-diameter turret 446. In this case the cans are loaded at 424 and are hoppered at 426 and then moved in horizontal collateral position past stations 430 and 432 for lining the cans. They are then turned upright and are received in the peripheral pockets of the large turret 446 which moves them through the mix transfer station 436, which cooperates with a mix hopper 438 and a mix turret 444 as well as a paper precut station 458 and a feed and takeup unit 456 for the blanked paper. The filled cans next move through a carbon inserting station 460; a subseal washer inserting station 470; a pitch station 472; and a "flaming station" 474. The numerals in FIG. 22 correspond to those in FIG. 1, but raised by 400.

In the arrangements of FIGS. 1, 21 and 22 the timing of the stations is controlled by a master cam shaft. This has appropriate cams for intermittent drive of the turrets and for operating the various plungers. In some cases it may be preferred to operate a plunger by pneumatic or hydraulic power. This is indicated by the hoses at 476 in FIGS. 1, 21, and 22. In such case the valves may be solenoid operated valves, the circuits of which are controlled by the same cam shaft or master timing shaft, as by means of cams which operate micro switches.

As so far described the stations have been assumed to operate in one to one ratio. However, in actual practice it has been found desirable to make the stations beginning with the mix transfer station 36 double stations; that is to say, two cans are loaded simultaneously. The advantage of this is that the can lining stations (30 and 32 in FIG. 1) may be operated at high speed; whereas the mix transfer operation preferably is given additional and adequate time, so that the mix may be tamped well into the can, with time for escape of air. Similarly the carbon insertion is preferably performed at the same slower rate than the can lining operation. In a typical case the cans may be lined at a rate of say 120 cans per minute, but may be loaded with mix at the rate of 60 cans per minute. However, the output is maintained at 120 cans per minute by using adjacent double stations beginning with the mix transfer station.

The precut die of FIGS. 8 and 9 is provided in duplicate; the mix transfer plunger of FIGS. 9 and 10 is provided in duplicate; and the paper strip feed and take-up mechanism at 56 (FIG. 9) moves the strip the distance of two wipedown washers at a time. The carbon rod inserting station of FIGS. 11–13 is provided in duplicate; the subseal washer inserting station of FIGS. 14 and 15 is provided in duplicate; and of course the pitching station of FIGS. 17 and 18 is likewise provided in duplicate. The turrets 46 and 66 (FIG. 1) receive two cans at a time in two adjacent pockets, and it is for that reason that the inner ends of the pushers shown at 50 and 68 are wide enough to move two adjacent cans at a time. Consistently, the turrets turn a distance corresponding to two adjacent can pockets each time that they turn.

Similar provision may be made in FIGS. 21 and 22, it being noted that in FIG. 21 the high speed stations 330 and 332 which line the can, precede and are independent of the turret 346. Similarly in FIG. 22 the stations 430 and 432 for lining the can precede and are independent of the turret 446. The desired two-to-one speed ratio between lining the can and filling the can is thus readily maintained.

It is believed that the construction and method of operation of my improved apparatus for manufacture of lined dry cells, as well as the advantages thereof, will be apparent from the foregoing detailed description. It will also be apparent that while I have shown and described the apparatus in several preferred forms, changes may be made without departing from the scope of the invention, as sought to be defined in the following claims.

I claim:

1. In the manufacture of a dry cell having a metal can, a liner, a carbon rod, and a mix between the rod and the liner, the method which includes shaping a measured quantity of the mix, disposing the same over a lined can, disposing a wipedown washer between the mix and a mix inserting plunger, and using the plunger to move the wipedown washer against the mix during insertion of the mix into the lined can.

2. In the manufacture of a dry cell having a zinc can, a liner, a carbon rod, and a pasty mix between the rod and the liner, the method which includes shaping a measured quantity of the mix, disposing the same over a lined can, feeding a paper strip between the mix and a mix inserting plunger, prepunching the strip at intervals and precutting wipedown washers ahead of the inserting plunger, said wipedown washers being somewhat greater in diameter than the inside of the cell, and using the plunger to finish blanking a wipedown washer from the strip and to move the same against the mix during insertion of the mix into the lined can.

3. In the manufacture of a dry cell having a metal can, a liner, a carbon rod, and a mix between the rod and the liner, the method which includes forming and inserting a cylindrical liner in the can, inserting a bottom liner disc, inserting the mix, forcing a carbon rod into the mix, inserting a subseal washer in the can above the cylindrical liner far enough to bend the top edge of the cylindrical liner inward, and adding molten pitch around the carbon rod above the subseal washer.

4. In the manufacture of a dry cell having a metal can, a liner, a carbon rod, and a mix between the rod and the liner, the method which includes forming and inserting a cylindrical liner in the can, inserting a bottom liner disc, using a wipedown washer to faciiltate insertion of and inserting a measured quantity of mix into the lined can, forcing a carbon rod through the wipedown washer into the mix, inserting a subseal washer in the can above the cylindrical liner far enough to bend the top edge of the cylindrical liner inward, and adding molten pitch around the carbon rod above the subseal washer.

5. In the manufacture of a dry cell having a zinc can, a liner, a carbon rod, and a pasty mix between the rod and the liner, the method which includes forming and inserting a cylindrical liner in the can, forming and inserting a bottom liner disc part way through the cylindrical liner, forming a wipedown washer and using the same to facilitate insertion of and inserting a measured and shaped quantity of mix into the lined can, forcing a carbon rod through the wipedown washer into the mix while holding the mix in position, inserting a subseal washer in the can above the cylindrical liner far enough to bend the top edge of the cylindrical liner inward, and adding molten pitch around the carbon rod above the subseal washer.

6. Apparatus for the manufacture of a dry cell having a metal can, a liner, a carbon rod, and a mix between the rod and the liner, said apparatus comprising means to shape a measured quantity of the mix, means to dispose the same over a lined can, a mix inserting plunger disposed over the shaped mix and the can, means to dispose a wipedown washer between the mix and the plunger and means to move the plunger down to move the wipedown washer against the mix while inserting the mix into the lined can.

7. Apparatus for the manufacture of a dry cell having a zinc can, a liner, a carbon rod, and a pasty mix between the rod and the liner, said apparatus comprising means to shape a measured quantity of the mix, means to dispose the same over a lined can, a mix inserting plunger disposed over the shaped mix and the can, means to feed a paper strip between the mix and the plunger, means to prepunch the strip at intervals and to precut wipedown washers, said washers being somewhat greater in diameter than the inside of the can, and means to move the plunger down to finish blanking a wipedown washer from the strip and to move the same against the mix while inserting the mix into the lined can.

8. Apparatus for the manufacture of dry cells having a metal can, a liner, a carbon rod, and a mix between the rod and the liner, said apparatus comprising means to insert a cylindrical liner in the can, means to insert a bottom liner disc, means to shape a measured quantity of mix, means to insert the shaped mix into the lined can, means to force a carbon rod into the mix, means to insert a subseal washer in the can above the cylindrical liner far enough to bend the top edge of the cylindrical liner inward, and means to add molten pitch around the carbon rod above the subseal washer.

9. Apparatus for the manufacture of dry cells having a metal can, a liner, a carbon rod, and a mix between the rod and the liner, said apparatus comprising means to insert a cylindrical liner in the can, means to insert a bottom liner disc, means to shape a measured quantity of mix, means to locate a wipedown washer over the mix, plunger means for bearing against the wipedown washer and using the same to facilitate insertion of the shaped mix into the lined can, means to force a carbon rod through the wipedown washer into the mix, means to insert a subseal washer in the can above the cylindrical liner far enough to bend the top edge of the cylindrical liner inward, and means to add molten pitch around the carbon rod above the subseal washer.

10. Apparatus for the manufacture of dry cells having a zinc can, a liner, a carbon rod, and a pasty mix between the rod and the liner, said apparatus comprising means to form and insert a cylindrical liner in the can, means to form and insert a bottom liner disc part way through the cylindrical liner, means to form a wipedown washer, means to shape a measured quantity of mix, plunger means bearing against the wipedown washer and using the same to facilitate insertion of the shaped mix into the lined can, means to force a carbon rod through the wipedown washer into the mix, means to hold the mix in position during the insertion of the carbon rod, means to insert a subseal washer in the can above the cylindrical liner far enough to bend the top edge of the cylindrical liner inward, and means to add molten pitch around the carbon rod above the subseal washer.

11. In the manufacture of dry cells having a metal can and a chemically treated cylindrical liner, the method which includes using a continuous uniform liner strip having a width equal to the desired cylinder length, feeding said strip lengthwise in a direction transverse to the axis of the desired cylinder and thereby pushing the end of the strip around the inside of a curved guide having its axis transverse to the long dimension of the strip and so curling one end of the liner strip into approximately cylindrical form, severing the curled end from the strip, using suction to suck the cylindrical liner against the perforated end of a plunger, using the plunger to insert the liner in the can, stopping the suction to release the liner from the plunger, and retracting the plunger.

12. In the manufacture of dry cells having a zinc can and a chemically treated cylindrical liner, the method which includes using a continuous uniform liner strip having a width equal to the desired cylinder length, feeding said strip lengthwise in a direction transverse to the axis of the desired cylinder and thereby pushing the end of the strip around the inside of a curved guide having its axis transverse to the long dimension of the strip and so curling one end of the liner strip into approximately cylindrical form, severing the curled end from the strip, using suction to suck the cylindrical liner against the perforated end of a plunger, using the plunger to insert the liner in the can, applying pressure instead of suction to the plunger to release the liner from the plunger and to expand the liner against the inside of the can, and retracting the plunger.

13. Apparatus for the manufacture of dry cells having a metal can and a chemically treated cylindrical liner, said apparatus comprising a curved guide, means to feed a continuous uniform liner strip in a direction transverse to the axis of the curved guide, said strip having a width equal to the desired cylinder length, said feed means serving to thereby push one end of the strip into the curved guide in order to curl the said end of the liner strip into approximately cylindrical form, means to thereafter sever the curled end from the strip by a cut which is transverse of the strip, a plunger having its axis transverse to the long dimension of the strip and having a hollow perforated end movable to a position inside the curved guide, means to apply suction to the plunger to suck the cylindrical liner against the perforated end of the plunger, means to advance the plunger to insert the liner in the can, and means to stop the suction in order to release the liner from the plunger prior to retraction of the plunger from the can.

14. Apparatus for the manufacture of dry cells having a zinc can and a chemically treated cylindrical liner, said apparatus comprising a curved guide, means to feed a continuous uniform liner strip in a direction transverse to the axis of the curved guide, said strip having a width equal to the desired cylinder length, said feed means serving to thereby push one end of the liner strip into the curved guide in order to curl the said end of the liner strip into approximately cylindrical form, means to thereafter sever the curled end from the strip by a cut which is transverse of the strip, a plunger having its axis transverse to the long dimension of the strip and having a hollow perforated end movable to a position inside the curved guide, means to apply suction to the plunger to suck the cylindrical liner against the perforated end of the plunger, means to advance the plunger to insert the liner in the can, means to apply pressure instead of suction in order to release the liner from the plunger and to expand the liner against the inside of the can prior to retraction of the plunger from the can.

References Cited by the Examiner

UNITED STATES PATENTS

| | | | |
|---|---|---|---|
| 1,971,251 | 8/1934 | Deibel | 136—175.1 |
| 2,366,935 | 1/1945 | Schmid | 269—21 |
| 2,428,098 | 9/1947 | Schmidt. | |
| 2,578,329 | 12/1951 | Von Hofe | 156—423 |
| 2,962,844 | 12/1960 | Orlando et al. | |

WINSTON A. DOUGLAS, *Primary Examiner.*

D. L. WALTON, *Assistant Examiner.*